United States Patent
Ahn et al.

(10) Patent No.: US 9,746,736 B2
(45) Date of Patent: Aug. 29, 2017

(54) LIQUID CRYSTAL DISPLAY

(71) Applicant: Samsung Display Co., Ltd., Yongin-si, Gyeonggi-do (KR)

(72) Inventors: Kyu Su Ahn, Seoul (KR); Hee Hwan Lee, Hwaseong-si (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 15/061,631

(22) Filed: Mar. 4, 2016

(65) Prior Publication Data

US 2016/0320683 A1    Nov. 3, 2016

(30) Foreign Application Priority Data

Apr. 29, 2015   (KR) .................. 10-2015-0060877

(51) Int. Cl.
 *G02F 1/1362* (2006.01)
 *G02F 1/1343* (2006.01)

(52) U.S. Cl.
 CPC .... *G02F 1/136286* (2013.01); *G02F 1/13624* (2013.01); *G02F 1/134309* (2013.01); *G02F 2001/134345* (2013.01); *G02F 2001/136218* (2013.01)

(58) Field of Classification Search
 CPC ... G02F 1/134336; G02F 2001/134354; G02F 2001/134345; G02F 2001/134381; G02F 1/136286; G02F 1/13624; G02F 1/134309; G02F 2001/136218
 See application file for complete search history.

(56) References Cited

U.S. PATENT DOCUMENTS

| 2015/0009442 | A1 | 1/2015 | Lee et al. |
| 2015/0036073 | A1 | 2/2015 | Im et al. |
| 2016/0104722 | A1* | 4/2016 | Woo ...................... G02F 1/1368 257/72 |
| 2016/0109768 | A1* | 4/2016 | Yu ........................ H01L 27/1225 257/72 |
| 2016/0109769 | A1* | 4/2016 | Seo ................... G02F 1/133753 349/43 |
| 2016/0116806 | A1* | 4/2016 | Shin .................. G02F 1/134309 349/138 |
| 2016/0147122 | A1* | 5/2016 | Hwang ............. G02F 1/133512 257/72 |

(Continued)

FOREIGN PATENT DOCUMENTS

| KR | 10-2009-0123738 A | 12/2009 |
| KR | 10-2013-0060550 A | 6/2013 |
| KR | 10-2015-0004140 A | 1/2015 |

(Continued)

*Primary Examiner* — Dennis Y Kim
(74) *Attorney, Agent, or Firm* — Innovation Counsel LLP

(57) ABSTRACT

Disclosed is a liquid crystal display, including: a first substrate, the first substrate including a voltage division reference voltage line and a pixel electrode, the pixel electrode including a first stem portion, a plurality of first fine branch portions obliquely extending from the first stem portion, a second stem portion, a plurality of second fine branch portions obliquely extending from the second stem portion, and a connection portion connecting the first fine branch portions and some of the second fine branch portions; in which the voltage division reference voltage line includes a bent portion bent at a portion overlapping the connection portion.

19 Claims, 13 Drawing Sheets

(56) References Cited

U.S. PATENT DOCUMENTS

2016/0202575 A1* 7/2016 Youk .................. G02F 1/134336
                                                    349/110
2016/0282682 A1* 9/2016 Kim .................... G02F 1/13624

FOREIGN PATENT DOCUMENTS

| KR | 10-2015-0016014 A | 2/2015 |
| KR | 10-2015-0016016 A | 2/2015 |
| KR | 10-2015-0024680 A | 3/2015 |
| KR | 10-2015-0030037 A | 3/2015 |
| KR | 10-2015-0031113 A | 3/2015 |
| KR | 10-2015-0044293 A | 4/2015 |

* cited by examiner

LIQUID CRYSTAL DISPLAY

RELATED APPLICATIONS

This application claims priority to and the benefit of Korean Patent Application No. 10-2015-0060877 filed in the Korean Intellectual Property Office on Apr. 29, 2015, the entire contents of which are incorporated herein by reference.

BACKGROUND

1. Field

The described technology relates generally to a liquid crystal display.

2. Description of the Related Art

A liquid crystal display, which is one of the most common types of flat panel displays currently in use, includes two sheets of display substrates with field generating electrodes and a liquid crystal layer interposed therebetween, and controls the intensity of transmitted light by rearranging the liquid crystal molecules of the liquid crystal layer by applying a voltage to the electrodes.

In order to increase a viewing angle of a vertical alignment liquid crystal display among the liquid crystal displays, there is suggested a method of implementing a plurality of domains by forming a pixel electrode, so that the pixel electrode includes a stem portion and a plurality of fine branch portions extending from the stem portion in different directions.

However, liquid crystal molecules disposed in distal end areas of the plurality of fine branch portions are arranged in a vertical direction by a lateral electric field so that a difference in transmittance is generated compared to the liquid crystal molecules arranged in an oblique direction, and thus a problem in side visibility is generated.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a liquid crystal display, which is capable of improving side visibility.

An exemplary embodiment provides a liquid crystal display, including: a first substrate; a gate line and storage electrode lines formed on the first substrate; a semiconductor layer formed on the gate line and the storage electrode lines; a data line, a drain electrode, and a voltage division reference voltage line formed on the semiconductor layer; a pixel electrode formed on the data line, the drain electrode, and the voltage division reference voltage line, and including a first stem portion, a plurality of first fine branch portions obliquely extending from the first stem portion, a second stem portion, a plurality of second fine branch portions obliquely extending from the second stem portion, and a connection portion connecting a portion of the first fine branch portions and a portion of the second fine branch portions; a second substrate facing the first substrate; and a common electrode formed on the second substrate, wherein the voltage division reference voltage line includes a bent portion bent at a portion overlapping the connection portion, and a horizontal portion connected with the bent portion and extending in a first direction while overlapping distal ends of the first fine branch portions and distal ends of the second fine branch portions.

The first stem portion may include a first vertical stem portion and a first horizontal stem portion connected with the first vertical stem portion and extending in a direction parallel to the gate line, and the second stem portion may include a second vertical stem portion and a second horizontal stem portion connected with the second vertical stem portion and extending in a direction parallel to the gate line. The bent portion may have a predetermined angle with respect to the first direction.

The horizontal portion may include a first horizontal portion overlapping the distal ends of the first fine branch portions extending from the first vertical stem portion, and a second horizontal portion overlapping the distal ends of the second fine branch portions extending from the second vertical stem portion.

The first horizontal portion and the second horizontal portion may be disposed at opposite sides of the connection portion.

The voltage division reference voltage line may include a plurality of vertical portions connected with the horizontal portion, and the plurality of vertical portions may overlap the first vertical stem portion and the second vertical stem portion.

An angle between an extending direction of the first fine branch portions and an extending direction of the second fine branch portions, which are adjacent to the first fine branch portions, may be 180°.

The pixel electrode may include a first subpixel electrode and a second subpixel electrode, which are disposed on opposite sides with respect to the gate line, and each of the first subpixel electrode and the second subpixel electrode may include the first stem portion, the plurality of first fine branch portions, the second stem portion, the plurality of second fine branch portions, and the connection portion.

The first stem portion of the first subpixel electrode includes a first vertical stem portion and a first horizontal stem portion connected with the first vertical stem portion and extending in a direction parallel to the gate line, and the second stem portion of the first subpixel electrode may include a second vertical stem portion and a second horizontal stem portion connected with the second vertical stem portion and extending in a direction parallel to the gate line.

The first stem portion of the second subpixel electrode includes a first vertical stem portion and a first horizontal stem portion connected with the first vertical stem portion and extending in a direction parallel to the gate line, and the second stem portion of the second subpixel electrode include a second horizontal stem portion connected with the second horizontal stem portion and extending in a direction parallel to the gate line.

The horizontal portion may include a plurality of horizontal portions, and the voltage division reference voltage line may include a plurality of vertical portions connected with the plurality of the horizontal portions, and the plurality of vertical portions may overlap the first vertical stem portion and the second vertical stem portion.

Sides, in which the voltage division reference voltage line is not formed, in the first subpixel area may be sides disposed at opposite sides in the two areas, and sides, in which the voltage division reference voltage line is not formed, in the second subpixel area may be sides disposed at opposite sides in the two areas.

The voltage division reference voltage line may include a plurality of vertical portions connected with the horizontal portion, and the plurality of vertical portions may overlap the first vertical stem portion and the second vertical stem portion.

The storage electrode line formed in the first subpixel electrode area may have a quadrangular ring shape surrounding four surfaces of an area, in which the first subpixel electrode is formed.

The storage electrode line formed in the second subpixel electrode area may have the same shape as that of the voltage division reference voltage line formed in the second subpixel electrode area, and be electrically insulated from the voltage division reference voltage line while overlapping the voltage division reference voltage line.

The liquid crystal display may further include a shielding electrode disposed on the same layer as that of the pixel electrode, in which the shielding electrode vertically may extend along one pixel area defined by the first subpixel electrode and the second subpixel electrode, and include a vertical portion overlapping the data line and a horizontal portion crossing a space between the first subpixel electrode and the second subpixel electrode.

Lengths of the first fine branch portions may decrease according to an increase in distance from the first vertical stem portion, and lengths of the second fine branch portions decrease according to an increase in distance from the second vertical stem portion.

The pixel electrode may further include includes a first edge portion connecting distal ends of the first fine branch portions, and connected with the first vertical stem portion and the first horizontal stem portion.

The pixel electrode may further include a second edge portion connecting distal ends of the second fine branch portions, and connected with the second vertical stem portion and the second horizontal stem portion.

DETAILED DESCRIPTION

Figure 1:
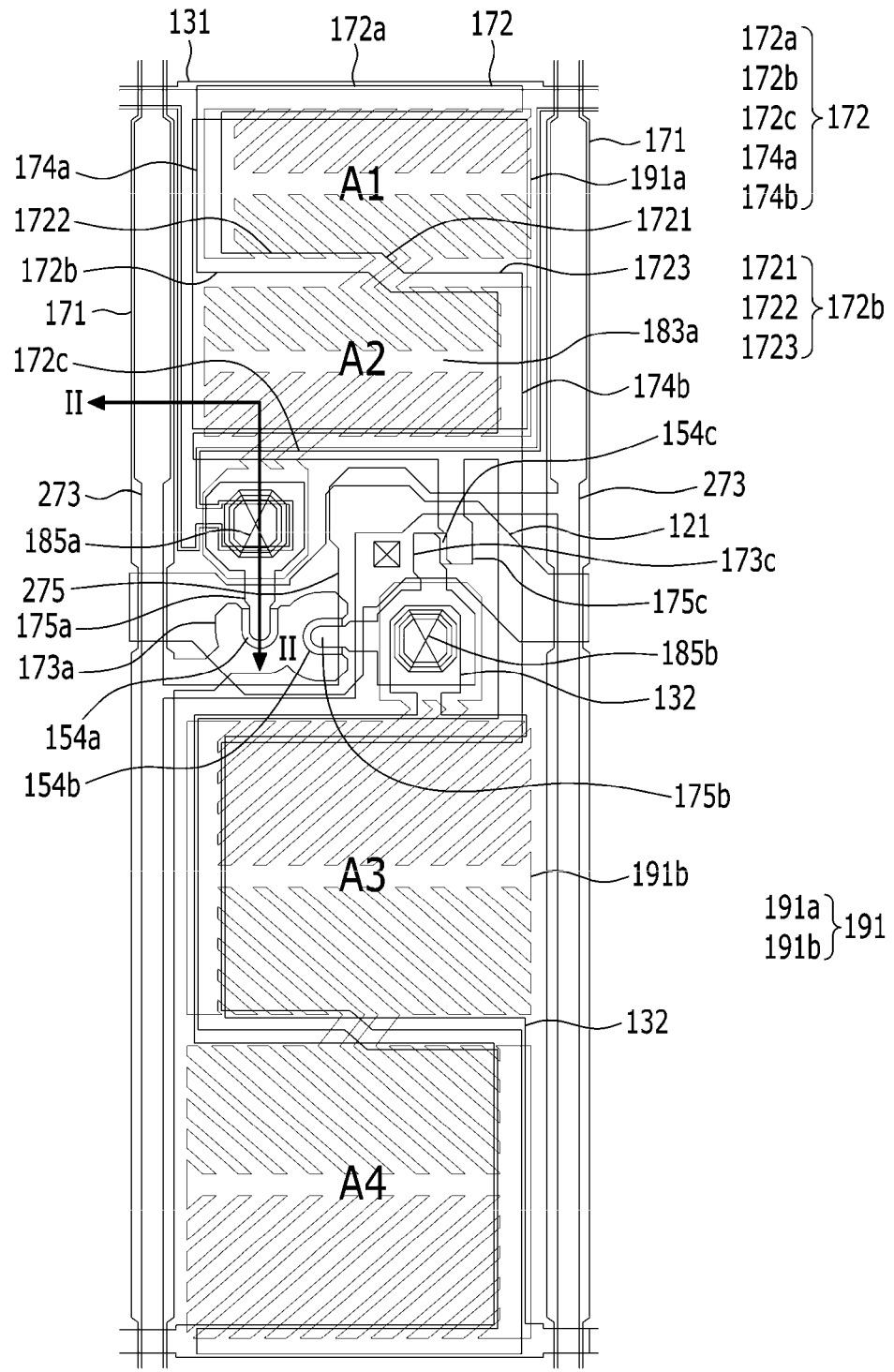
FIG. 1 is a layout view of a thin film transistor array panel according to an exemplary embodiment.

The embodiments of the present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a thin film transistor array panel according to an exemplary embodiment and a method of manufacturing the same will be described in detail with reference to the accompanying drawings.

Figure 2:
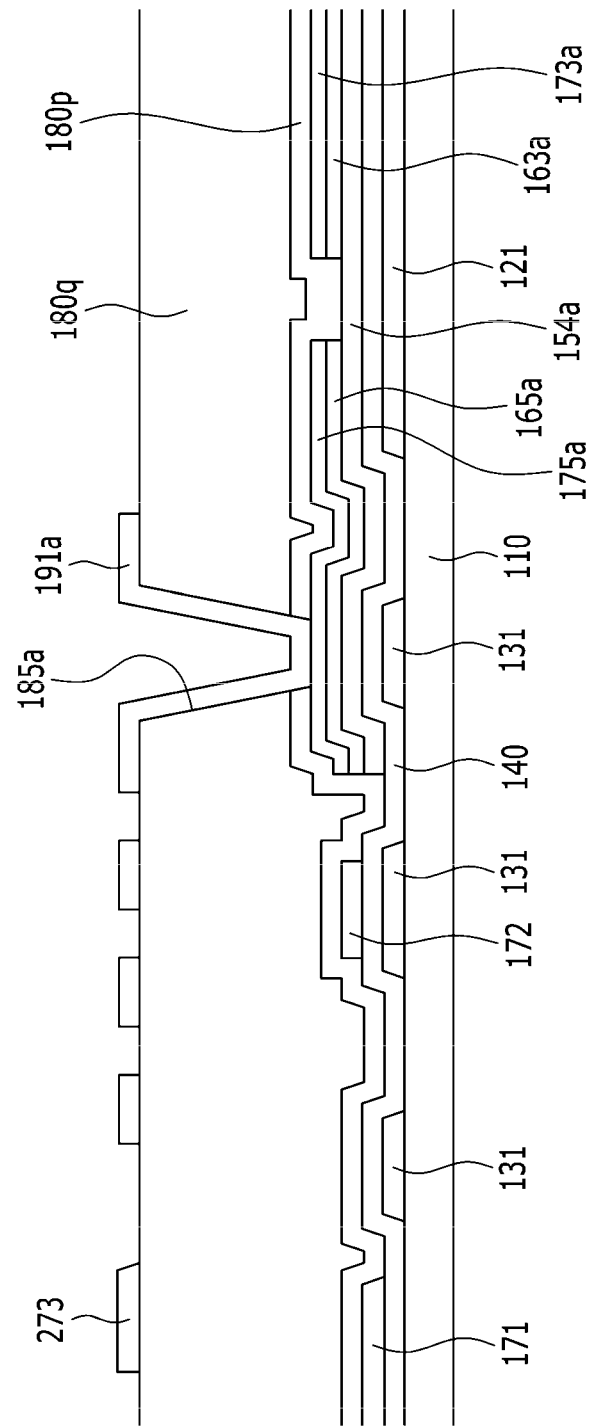
FIG. 2 is a cross-sectional view illustrating the thin film transistor array panel of FIG. 1 taken along line II-II.
Figure 3:
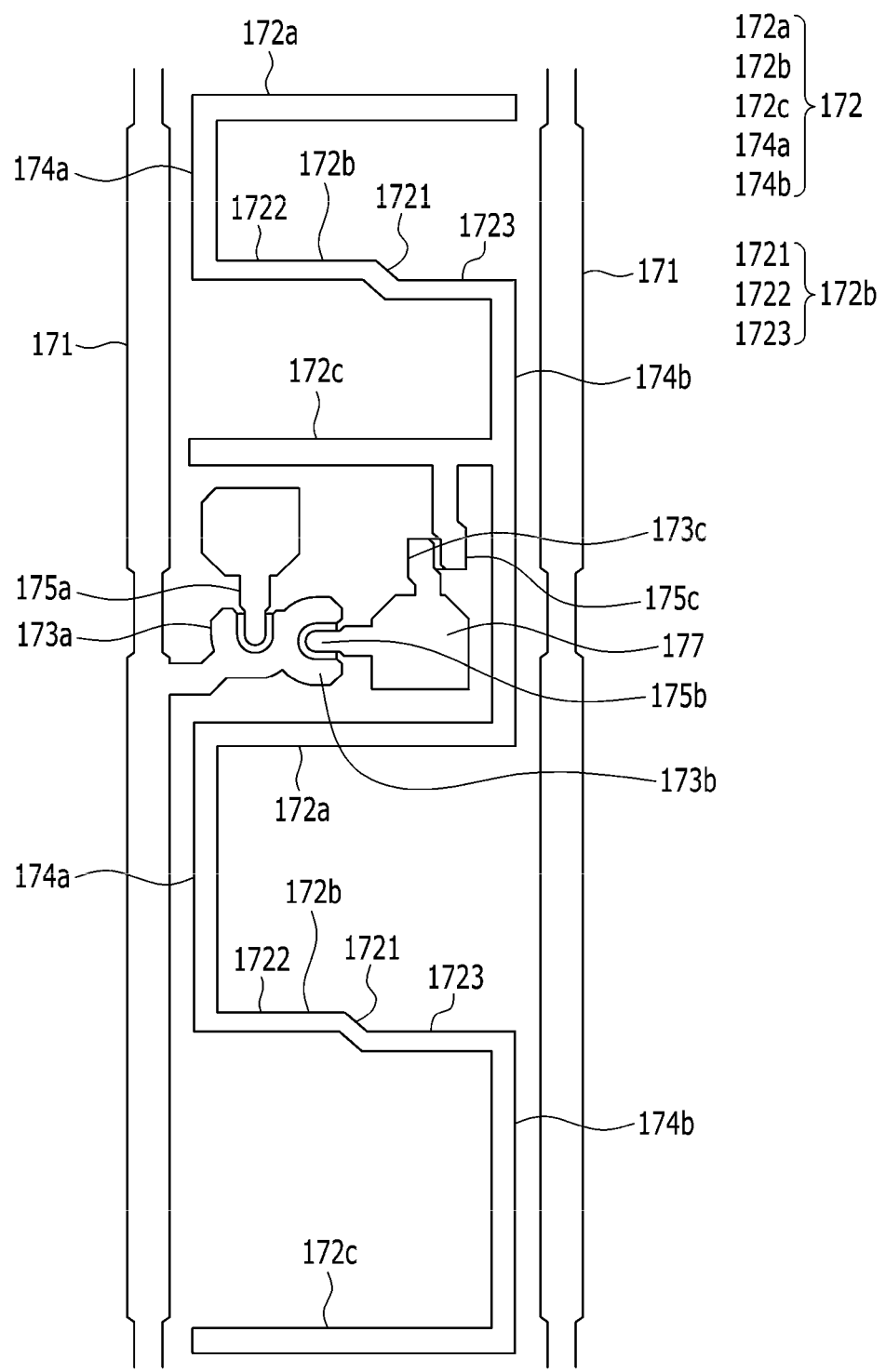
FIG. 3 is a diagram illustrating a data line and a voltage division reference voltage line of the thin film transistor array panel according to the exemplary embodiment.
Figure 4:
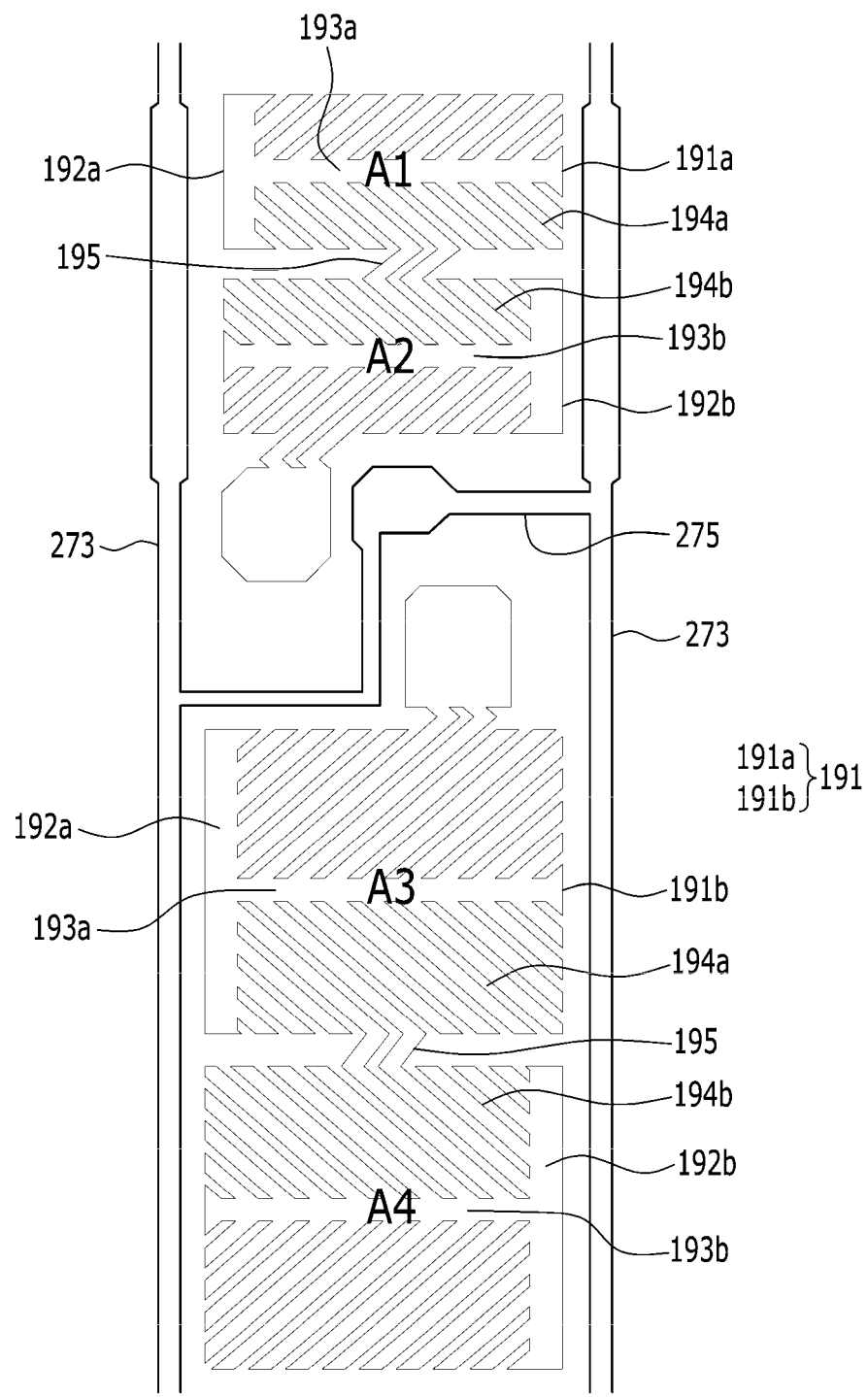
FIG. 4 is a diagram illustrating a pixel electrode and a shielding electrode according to the exemplary embodiment.
Figure 5:
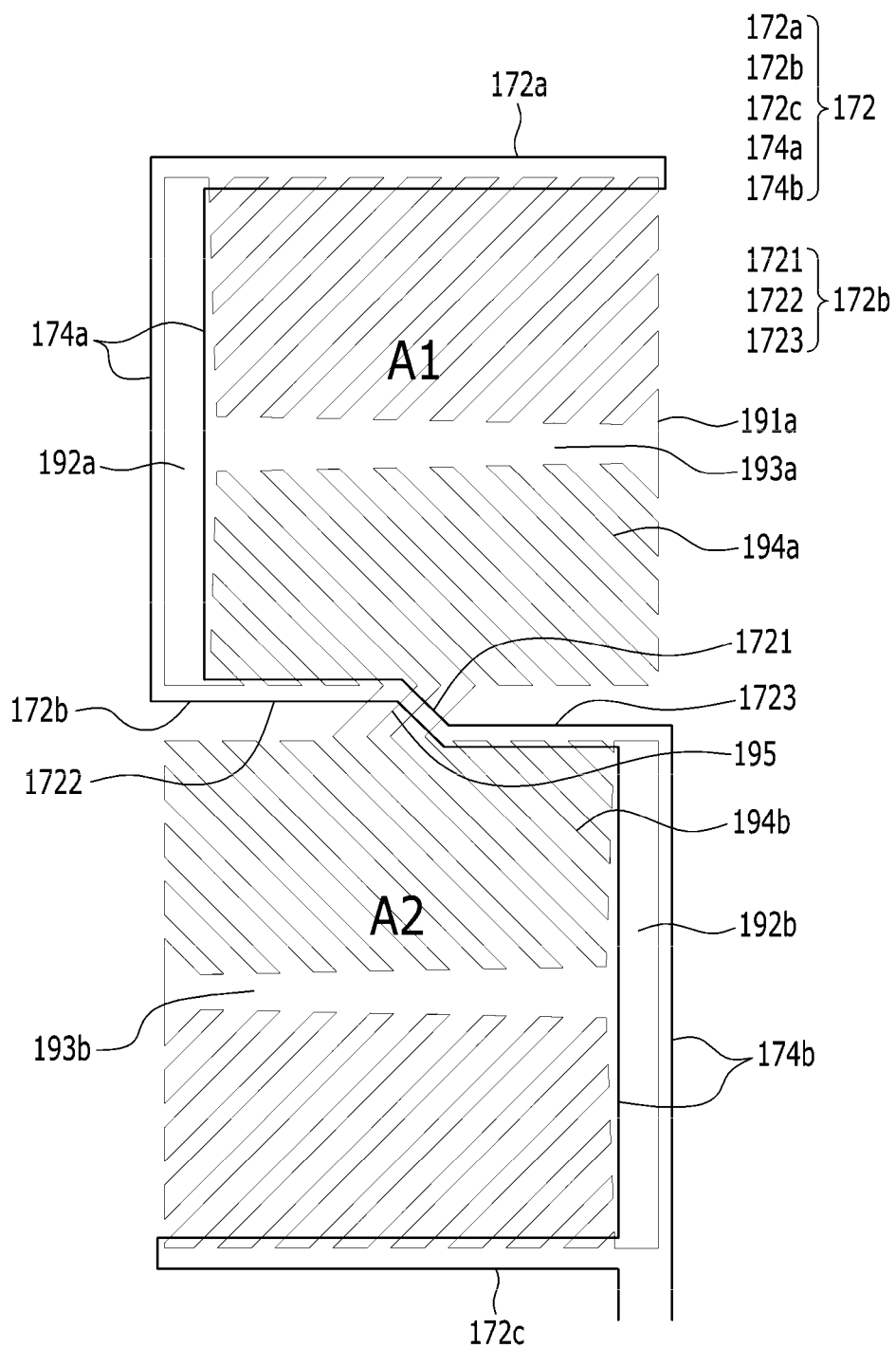
FIG. 5 is a diagram illustrating a subpixel electrode and the voltage division reference voltage line according to the exemplary embodiment.

First, a thin film transistor array panel according to an exemplary embodiment will be described with reference to FIGS. 1 to 4. FIG. 1 is a layout view of a thin film transistor array panel according to an exemplary embodiment. FIG. 2 is a cross-sectional view illustrating the thin film transistor array panel of FIG. 1 taken along line II-II. FIG. 3 is a diagram illustrating a data line and a voltage division reference voltage line of the thin film transistor array panel according to the exemplary embodiment. FIG. 4 is a diagram illustrating a pixel electrode and a shielding electrode according to the exemplary embodiment. FIG. 5 is a diagram illustrating a subpixel electrode and the voltage division reference voltage line according to the exemplary embodiment.

Gate conductors including a gate line 121 and storage electrode lines 131 and 132 are formed on an insulating substrate 110 formed of transparent glass, plastic, or the like.

The gate line 121 includes a gate electrode and a wide end portion (not illustrated) for a contact with another layer or an external driving circuit. The gate line 121 may be made of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), tantalum (Ta), and titanium (Ti). However, the gate line 121 may also have a multilayered structure including two or more conductive layers having different physical properties.

The gate line 121 horizontally crosses one pixel area. An upper area of the gate line 121 becomes a first subpixel area displaying a high gray scale, and a lower area of the gate line 121 becomes a second subpixel area displaying a low gray scale.

The storage electrodes lines 131 and 132 may be formed of the same material as the gate line 121, and may be formed with the gate line 121 by a same process.

The storage electrode line 131 on the upper area of the gate line 121 may surround the first subpixel area and have a quadrangular form. A side disposed at the uppermost side in the quadrangular storage electrode line 131 horizontally extends and is connected with another layer or an external driving circuit.

The storage electrode line 132 on the lower area of the gate line 121 may be formed in the second subpixel area in a shape similar to a digital number 5. That is, the storage electrode line 132 includes a plurality of horizontal electrode units and a plurality of horizontal electrodes units connecting edges of the plurality of horizontal electrode units, and the vertical electrode unit connects adjacent two horizontal electrode units. That is, the first horizontal electrode unit and the second horizontal electrode unit are connected at a left side by the vertical electrode unit, and the second horizontal electrode unit and the third horizontal electrode unit are connected at a right side by the vertical electrode unit. The third horizontal electrode unit disposed at the lowermost end of the storage electrode line 132 horizontally extends and is connected with another layer or an external driving circuit.

The third horizontal electrode unit of the storage electrode line 132 may be an upper horizontal electrode unit of the storage electrode line 131 of another pixel area disposed thereunder. That is, the number of horizontal electrode units horizontally extended in one pixel area and connected with another layer or an external driving circuit is one.

A gate insulating layer 140 is formed on the gate conductors.

A first semiconductor 154a, a second semiconductor 154b, and a third semiconductor 154c are formed on the gate insulating layer 140.

A plurality of ohmic contacts 163a and 165a are formed on the semiconductor 154a, 154b, and 154c.

Data conductors, which include a data line 171 and a voltage division reference voltage line 172, are formed on the ohmic contacts 163a and 165a and the gate insulating layer 140. The data conductors, and the semiconductors and the ohmic contacts disposed under the data conductors may be simultaneously formed by using one mask.

FIG. 3 illustrates the data conductors of the thin film transistor array panel according to the exemplary embodiment.

The data conductors include the data line 171, a first drain electrode 175a, a second drain electrode 175b, and the voltage division reference voltage line 172.

The data line 171 extends in a vertical direction along one pixel area, and includes a first source electrode 173a and a second source electrode 173b.

Further, the data conductors include the voltage division reference voltage line 17. The voltage division reference voltage line 172 includes a third drain electrode 175c.

Referring to FIG. 3, the voltage division reference voltage line 172 includes a plurality of horizontal portions 172a, 172b, and 172c, and vertical portions 174a and 174b connecting the plurality of horizontal portions 172a, 172b, and 172c, and is formed in a shape similar to a digital number 5. That is, the voltage division reference voltage line 172 includes the plurality of horizontal portions 172a, 172b, and 172c, and the plurality of vertical portions 174a and 174b connecting the plurality of horizontal portions 172a, 172b, and 172c, and the vertical portions 174a and 174b connect one ends of the parallel horizontal portions 172a, 172b, and 172c. That is, when the upper horizontal portion 172a and the center horizontal portion 172b are connected at a left side by the first vertical portion 174a, the center horizontal portion 172b and the lower horizontal portion 172c are connected at a right side by the second vertical portion 174b.

The voltage division reference voltage line 172 has a shape similar to a digital number 5 in each of the first subpixel area and the second subpixel area. When a length of the second subpixel area is larger than a length of the first subpixel area, a length of the voltage division reference voltage line 172 in the second subpixel area is also increased.

The voltage division reference voltage line 172 divides the first subpixel area, in which the first subpixel electrode 191a exists, into two areas A1 and A2 to surround three sides of an individual area. For example, a first area A1 is surrounded by the upper horizontal portion 172a, the center horizontal portion 172b, and the first vertical portion 174a in a shape of turning the alphabet "U" to the right, and a second area A2 is surrounded by the center horizontal portion 172b, the lower horizontal portion 172c, and the second vertical portion 174b in a shape of turning the alphabet "U" to the left.

In this case, a side of the first area A1, which is not surrounded by the upper horizontal portion 172a, the center horizontal portion 172b, and the first vertical portion 174a, and a side of the second area A2, which is not surrounded by the center horizontal portion 172b, the lower horizontal portion 172c, and the second vertical portion 174b, may be disposed at opposite sides in the first subpixel area.

Further, the voltage division reference voltage line 172 divides the second subpixel area, in which the second subpixel electrode 191b exists, into two areas A3 and A4 to surround three sides of an individual area. For example, a third area A3 is surrounded by the upper horizontal portion 172a, the center horizontal portion 172b, and the first vertical portion 174a in a shape of turning the alphabet "U" to the right, and a fourth area A4 is surrounded by the center horizontal portion 172b, the lower horizontal portion 172c, and the second vertical portion 174b in a shape of turning the alphabet "U" to the left.

In this case, a side of the third area A3, which is not surrounded by the upper horizontal portion 172a, the center horizontal portion 172b, and the first vertical portion 174a, and a side of the fourth area A4, which is not surrounded by the center horizontal portion 172b, the lower horizontal portion 172c, and the second vertical portion 174b, may be disposed at opposite sides in the second subpixel area.

The voltage division reference voltage line 172 may also be formed in a horizontally reversed shape of the aforementioned shape according to a direction of a pixel electrode, which is formed later. That is, the voltage division reference voltage line 172 may have a shape similar to a horizontally reversed digital number 5 in each of the first subpixel area and the second subpixel area.

A part of the lower horizontal portion 172c disposed at the lowermost side in the voltage division reference voltage line 172 disposed in the first subpixel area is branched in a down direction to be the third drain electrode 175c.

In the present exemplary embodiment, the voltage division reference voltage line 172 includes 'the upper horizontal portion 172a,' 'the first vertical portion 174a,' 'the center horizontal portion 172b,' 'the second vertical portion 174b' and 'the lower horizontal portion 172c'.

However, according to one exemplary embodiment of the present inventive concept, the voltage division reference voltage line 172 may be changed in various forms, and one or more of 'the upper horizontal portion 172a,' 'the lower horizontal portion 172c,' 'the first vertical portion 174a,' and 'the second vertical portion 174b' may be omitted.

For example, in one exemplary embodiment of the present inventive concept, the voltage division reference voltage line 172 may include only 'the upper horizontal portion 172a,' 'the center horizontal portion 172b,' and 'the lower horizontal portion 172c', or only 'the first vertical portion 174a,' 'the center horizontal portion 172b,' and 'the second vertical portion 174b' according to form of the pixel electrode 191.

The first gate electrode 124a, the first source electrode 173a, and the first drain electrode 175a form one first thin film transistor Qa together with the first island-shaped semiconductor 154a, and a channel of the thin film transistor is formed in the first semiconductor 154a between the first source electrode 173a and the first drain electrode 175a. Similarly, the second gate electrode 124b, the second source electrode 173b, and the second drain electrode 175b form one second thin film transistor Qb together with the second island-shaped semiconductor 154b, a channel of the thin film transistor is formed in the second semiconductor 154b between the second source electrode 173b and the second drain electrode 175b, and the third gate electrode 124c, the third source electrode 173c, and the third drain electrode 175c form a third thin film transistor Qc together with the third island-shaped semiconductor island 154c, and a channel of the thin film transistor is formed in the semiconductor 154c between the third source electrode 173c and the third drain electrode 175c.

The second drain electrode 175b is connected with the third source electrode 173c, and includes a widely expanded portion 177.

A first passivation layer 180p is formed on the data conductors and the exposed portions of the semiconductors 154a, 154b, and 154c. The first passivation layer 180p may include an inorganic insulating layer, such as a silicon nitride or a silicon oxide. When a second passivation layer 180q is a color filter, the first passivation layer 180p may prevent pigment of a color filter 230 from flowing into the exposed portions of the semiconductors 154a, 154b, and 154c.

The second passivation layer 180q is disposed on the first passivation layer 180p. The second passivation layer 180q may be omitted. The second passivation layer 180q may be a color filter. When the second passivation layer 180q is the color filter, the second passivation layer 180q may intrinsically display one of the primary colors, and examples of the primary colors may include the three primary colors, such as red, green, or blue, or yellow, cyan, and magenta, or the like. Although not illustrated in the drawings, the color filter may further include a color filter displaying a mixed color of the primary colors or white in addition to the primary colors.

A first contact hole 185a and a second contact hole 185b exposing the first drain electrode 175a and the second drain electrode 175b are formed in the first passivation layer 180p and the second passivation layer 180q.

A plurality of pixel electrodes 191 is formed on the second passivation layer 180q. The pixel electrodes 191 are separated from each other with the gate line 121 interposed therebetween, and include the first subpixel electrode 191a and the second subpixel electrode 191b adjacent to each other in a column direction with the gate line 121 interposed therebetween. The pixel electrode 191 may be formed of a transparent material, such as an ITO and an IZO. The pixel electrode 191 may also be made of a transparent conductive material, such as an ITO or an IZO, or a reflective metal, such as aluminum, silver, chromium, or an alloy thereof.

A shielding electrode 273 formed of the same material as that of the pixel electrode 191 may be formed on the same layer as the pixel electrode 191 on the second passivation layer 180q. The pixel electrode 191 and the shielding electrode 273 may be simultaneously formed by the same process.

FIG. 4 illustrates shapes of the pixel electrode 191 and the shielding electrode 273 according to the exemplary embodiment.

Hereinafter, the shapes of the pixel electrode 191 and the shielding electrode 273 of the thin film transistor array panel of the present inventive concept will be described in detail with reference to FIG. 4.

First, the shielding electrode 273 will be described. The shielding electrode 273 includes a vertical electrode portion overlapping the data line at an edge of one pixel area and one or more horizontal electrode portions 275 connecting the adjacent vertical electrode portions. The horizontal electrode portion 275 of the shielding electrode 273 may have an expanded portion at a center thereof.

The same voltage as that of the common electrode (not illustrated) is applied to the shielding electrode 273. Accordingly, an electric field is not generated between the shielding electrode 273 and the common electrode, and a liquid crystal layer disposed between the shielding electrode 273 and the common electrode is not realigned even when data voltages are applied to pixel electrodes to alter an aligning direction of liquid crystal molecules in the liquid crystal layer. Accordingly, a liquid crystal between the shielding electrode 273 and the common electrode becomes a black state even after the data voltages are applied to the pixel electrodes. When the liquid crystal displays black, the liquid crystal itself may serve as a black matrix. Accordingly, in the liquid crystal display including the thin film transistor array panel according to the exemplary embodiment, the black matrix typically disposed on the upper display substrate may also be removed. That is, the liquid crystal between the shielding electrode 273 and the common electrode performs a function of the black matrix.

Then, the pixel electrode 191 will be described. The pixel electrodes 191 are separated from each other with the gate line 121 interposed therebetween, and include the first subpixel electrode 191a and the second subpixel electrode 191b adjacent to each other in a column direction with the gate line 121 interposed therebetween.

The first subpixel electrode 191a includes first stem portions 192a and 193a, and a plurality of first fine branch portions 194a obliquely extending from the first stem portions 192a and 193a, and second stem portions 192b and 193b, and a plurality of second fine branch portions 194b obliquely extending from the second stem portions 192b and 193b. Further, the first subpixel electrode 191a includes connection portions 195 connecting a portion of the plurality of first fine branch portions 194a and a portion of the plurality of second fine branch portions 194b.

Referring to FIG. 4, the first subpixel electrode 191a is divided into the first area A1 including the first stem portions 192a and 193a and the plurality of first fine branch portions 194a obliquely extending from the first stem portions 192a and 193a, and the second area A2 including the second stem portions 192b and 193b and the plurality of second fine branch portions 194b obliquely extending from the second stem portions 192b and 193b.

The first stem portions 192a and 193a include a first horizontal stem portion 193a and a first vertical stem portion 192a connected to the first horizontal stem portion 193a while being orthogonal to the first horizontal stem portion 193a at the left side of the first horizontal stem portion 193a. The plurality of first fine branch portions 194a extending from the first stem portion 193a obliquely extends in a direction in which the distal ends of the plurality of first fine branch portion 194*a* becomes distant from the first vertical stem portion 192.

In the meantime, the second stem portions 192*b* and 193*b* include a second horizontal stem portion 193*b* and a second vertical stem portion 192*b* connected to the second horizontal stem portion 193*b* while being orthogonal to the second horizontal stem portion 193*b* at a right side. That is, the first vertical stem portion 192*a* and the second vertical stem portion 192*b* are disposed in opposite sides of the first pixel electrode 191*a* at an edge of the pixel area.

The plurality of second fine branch portions 194*b* extending from the second horizontal stem portion 193*b* obliquely extend in a direction, in which the distal ends of the plurality of second fine branch portions 194*b* becomes distant from the second vertical stem portion 192*b*. That is, a heading direction of the plurality of first fine branch portions 194*a* is different from a heading direction of the plurality of second fine branch portions 194*b*. In this case, an angle between the direction, in which the first fine branch portion 194*a* extends, and the direction, in which the second fine branch portion 194*b*, which is adjacent to the first fine branch portion 194*a* with the connection portion 195 inter posed therebetween, extends, may be about 180°.

However, the direction is illustrative, and when the first vertical stem portion 192*a* is disposed at a right edge of the pixel area and the second vertical stem portion 192*b* is disposed at a left edge of the pixel area, the plurality of first fine branch portions 194*a* obliquely extend while being distant from the right side to the left side, and the plurality of second fine branch portion 194*b* obliquely extend while being distant from the left side to the right side.

Four domains exist in an area of the first subpixel electrode 191*a*.

The first subpixel electrode 191*a* includes four domains, that is, a first domain obliquely extending from the first stem portions 192*a* and 193*a* in a right-up direction, a second domain obliquely extending from the first stem portions 192*a* and 193*a* in a right-down direction, a third domain obliquely extending from the second stem portion 192*b* and 193*b* in a left-up direction, and a fourth domain obliquely extending from the second stem portions 192*b* and 193*b* in a left-down direction.

Some of the plurality of first fine branch portions 194*a* extending from the first horizontal stem portion 193*a* are connected with some of the plurality of second fine branch portions 194*b* extending from the second horizontal stem portion 193*b* through the connection portion 195. Further, some of the plurality of second fine branch portions 194*b* extending from the second horizontal stem portion 193*b* are connected with the extending portion of the first subpixel electrode 191*a* to receive a voltage from the first drain electrode 175*a* through the first contact hole 185*a*.

A shape of the second subpixel electrode 191*b* is the same as that of the first subpixel electrode 191*a*.

The second subpixel electrode 191*b* includes the first stem portions 192*a* and 193*a*, and the plurality of first fine branch portions 194*a* obliquely extending from the first stem portions 192*a* and 193*a*, and the second stem portions 192*b* and 193*b*, and the plurality of second fine branch portions 194*b* obliquely extending from the second stem portions 192*b* and 193*b*. Further, the first subpixel electrode 191*a* includes the connection portions 195 connecting some of the plurality of first fine branch portions 194*a* and some of the plurality of second fine branch portions 194*b*.

The second subpixel electrode 191*b* is divided into the third area A3 including the first stem portions 192*a* and 193*a* and the plurality of first fine branch portions 194*a* obliquely extending from the first stem portions 192*a* and 193*a*, and the fourth area A4 including the plurality of second fine branch portions 194*b* obliquely extending from the second stem portions 192*b* and 193*b*.

Some of the plurality of first fine branch portions 194*a* extending from the first horizontal stem portion 193*a* are connected with the extending portion of the second subpixel electrode 191*b* to receive a voltage from the second drain electrode 175*b* through the second contact hole 185*b*. In this case, a part of the data voltage applied to the second drain electrode 175*b* is divided through the third source electrode 173*c*, so that the voltage applied to the first subpixel electrode 191*a* becomes higher than the voltage applied to the second subpixel electrode 191*b*.

Four domains exist in an area of the second subpixel electrode 191*b*.

The second subpixel electrode 191*b* includes four domains, that is, a first domain obliquely extending from the first stem portions 192*a* and 193*a* in a right-up direction, a second domain obliquely extending from the first stem portions 192*a* and 193*a* in a right-down direction, a third domain obliquely extending from the second stem portions 192*b* and 193*b* in a left-up direction, and a fourth domain obliquely extending from the second stem portions 192*b* and 193*b* in a left-down direction.

Each horizontal stem portion and each fine branch portion of the second subpixel electrode 191*b* are the same as those of the first subpixel electrode 191*a*. Therefore, specific description of the same contents will be omitted.

FIG. 5 is a diagram illustrating the subpixel electrode and the voltage division reference voltage line according to the exemplary embodiment. The subpixel electrode and the voltage division reference voltage line in the first subpixel area will be described with reference to FIG. 5.

The upper horizontal portion 172*a* of the voltage division reference voltage line 172, which is disposed at the topmost end of the voltage division reference voltage line 172 and extending from the right side to the left side, is disposed at an upper edge of the first fine branch portion 194*a* to overlap distal end portions of the first fine branch portion 194*a*.

The first vertical portion 174*a*, which is connected to the upper horizontal portion 172*a* of the voltage division reference voltage line 172 and disposed at the left side, overlaps the first vertical stem portion 192*a* of the first subpixel electrode 191*a*.

The center horizontal portion 172*b* of the voltage division reference voltage line 172, which is connected with the first vertical portion 174*a* and extending from the left side to the right side, is disposed between the plurality of first fine branch portions 194*a* extending from the first horizontal stem portion 193*a* of the first subpixel electrode 191*a* and the plurality of second fine branch portions 194*b* extending from the second horizontal stem portion 193*b*.

More particularly, the center horizontal portion 172*b* includes a bent portion 1721 bent at a portion overlapping the connection portion 195, and a first horizontal portion 1722 and a second horizontal portion 1723 connected with the bent portion 1721 and disposed at both sides of the connection portion 195, respectively.

The first horizontal portion 1722 extends in a first direction while overlapping a distal end of the plurality of first fine branch portions 194*a* extending from the first vertical stem portion 192*a*, and the second horizontal portion 1723 extends in the first direction while overlapping a distal end of the plurality of second fine branch portions 194*b* extending from the second vertical stem portion 192*b*.

The bent portion 1721 is inclined at a predetermined angle to the first direction.

In this case, the first direction may be a horizontal direction. For example, the first direction may be a direction, in which one end of the bent portion 1721 is connected with the first vertical portion 174a, or a direction, in which the other end of the bent portion 1721 is connected with the second vertical portion 174b.

That is, the first horizontal portion 1722 extends from the left side to the right side while overlapping the distal end of the plurality of first fine branch portions 194a, and the second horizontal portion 1723 extends from the left side to the right side while overlapping the distal end of the plurality of second fine branch portions 194b facing the plurality of first fine branch portions 194a.

However, the direction is illustrative, and when the first vertical stem portion 192a is disposed at the right edge of the pixel area and the second vertical stem portion 192b is disposed at the left edge of the pixel area, the first horizontal portion 1722 extends from the right side to the left side while overlapping the distal end of the plurality of first fine branch portions 194a, and the second horizontal portion 1723 extends from the right side to the left side while overlapping the distal end of the plurality of second fine branch portions 194a facing the plurality of first fine branch portions 194a based on the bent portion 1721. That is, the first horizontal portion 1722 overlapping the distal ends of the first fine branch portions 194a is disposed in a direction, in which the first vertical stem portion 192a is disposed, and the second horizontal portion 1723 overlapping the distal ends of the second fine branch portions 194b is disposed in a direction, in which the second vertical stem portion 192b is disposed.

The second vertical portion 174b of the voltage division reference voltage line 172, which is connected with the center horizontal portion 172b of the voltage division reference voltage line 172 and is disposed at the right side of one pixel area, extends in the second subpixel area. However, the lower horizontal portion 172c extends at the center of the second vertical portion 174b in the left direction.

The lower horizontal portion 172c of the voltage division reference voltage line 172 is disposed at the lower edge of the second fine branch portions 194b extending from the second horizontal stem portion 193b of the first subpixel electrode 191a.

Although not illustrated, the second subpixel area is also the same as the first subpixel area.

As described above, the first horizontal portion 1722 of the voltage division reference voltage line 172 according to the exemplary embodiment overlaps the distal ends of the first fine branch portions 194a and the second horizontal portion 1723 is formed so as to overlap the distal ends of the second fine branch portions 194b to cover the area, in which the liquid crystals are vertically arranged, thereby improving side visibility.

Figure 6:
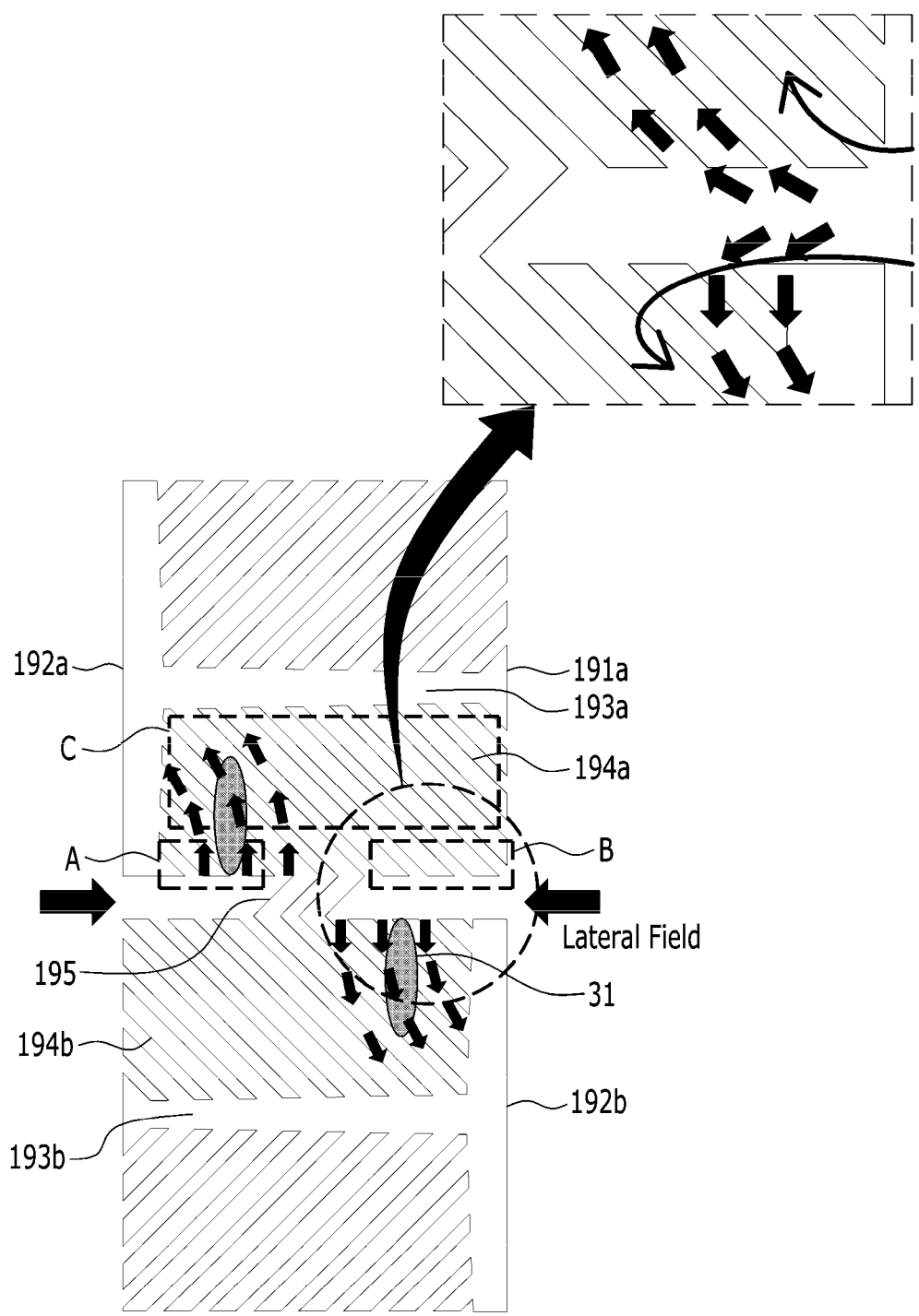
FIG. 6 is a conceptual diagram illustrating a part of the subpixel electrode according to the exemplary embodiment.
Figure 7:
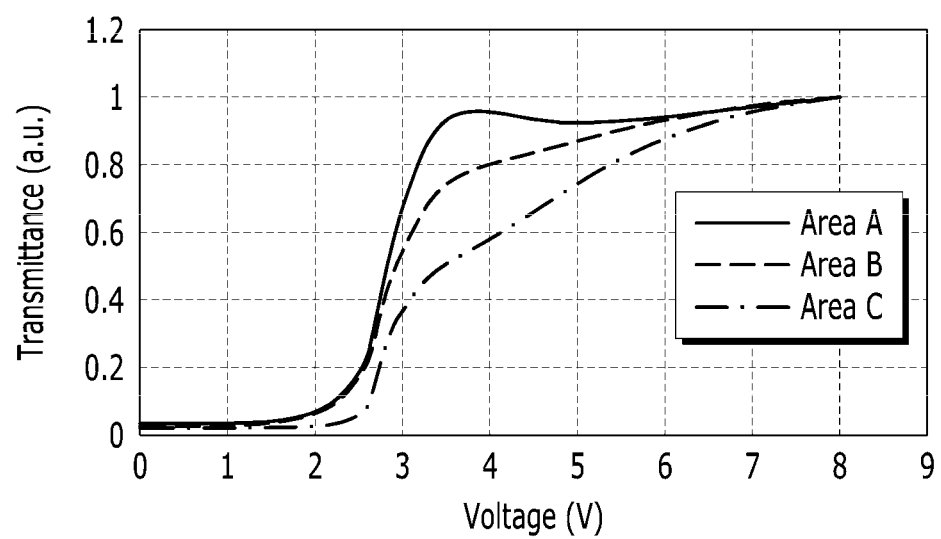
FIG. 7 is a simulation diagram illustrating transmittance of portions of pixel according to an applied voltage according to the exemplary embodiment.

This will be described in more detail with reference to FIGS. 6 and 7. FIG. 6 is a conceptual diagram illustrating a part of the subpixel electrode according to the exemplary embodiment. FIG. 7 is a simulation diagram illustrating transmittance to a voltage in a partial area of the pixel electrode according to the exemplary embodiment.

First, referring to FIG. 6, the first subpixel electrode 191a according to the exemplary embodiment includes the first stem portions 192a and 193a and the plurality of first fine branch portions 194a obliquely extending from the first stem portions 192a and 193a, and the second stem portions 192b and 193b and the plurality of second fine branch portions 194b obliquely extending from the second stem portions 192b and 193b. Further, the first subpixel electrode 191a includes the connection portions 195 connecting some of the plurality of first fine branch portions 194a and some of the plurality of second fine branch portions 194b.

In this case, a strong lateral field is formed between the plurality of first fine branch portions 194a and the plurality of second fine branch portions 194b which face each other. That is, the liquid crystal 31 is vertically arranged to the distal end portions of the first subpixel electrode 191a by the lateral field.

The area, in which the liquid crystal 31 is arranged, may be generally divided into a distal end area A of the plurality of first fine branch portions 194a while being adjacent to the first vertical stem portion 192a, a distal end area B of the plurality of first fine branch portions 194a while being disposed in an opposite side of the first subpixel electrode 191a with respect to the connection portion 195, and a center area C of the plurality of first fine branch portions 194a.

Although the area is not displayed, the second stem portions 192b and the plurality of second fine branch portions 194b obliquely extending to the outside from the second stem portions 192b and 193b may also be divided into a distal end area A of the plurality of second fine branch portions 194b while being adjacent to the second vertical stem portion 192b, a distal end area B of the plurality of second fine branch portions 194b while being disposed in an opposite side of the first subpixel electrode 191a with respect to the connection portion 195, and a center area C of the plurality of second fine branch portions 194b.

The liquid crystal 31 is vertically arranged to the distal end portions of the first subpixel electrode 191a by the lateral field in the distal end areas A and B of the plurality of first fine branch portions 194a and the plurality of second fine branch portions 194b, which face each other, and the liquid crystal 31 is obliquely arranged in the direction of the first fine branch portions 194a or the second fine branch portions 194b in the center areas C of the plurality of first fine branch portions 194a and the plurality of second fine branch portions 194b.

Further, the liquid crystal layer 31 disposed in the distal end area A of the first fine branch portions 194a extending from the first vertical stem portion 192a while being adjacent to the first vertical stem portion 192a is more vertically arranged than the liquid crystal 31 disposed in the opposite side of the first vertical stem portion 192a with respect to the connection portion 195 and disposed at the distal end area B of the plurality of first fine branch portions 194a. The lateral field is vertically formed by the first vertical stem portion 192a in the distal end area A of the first fine branch portions 194a extended from the first vertical stem portion 192a while being adjacent to the first vertical stem portion 192a. However, there is no first vertical stem portion 192a in the distal end area B of the plurality of first fine branch portions 194a disposed in the opposite side of the first vertical stem portion 192a with respect to connection portion 195, so that the lateral field is formed while being inclined at a predetermined angle.

That is, the liquid crystal 31 is more vertically arranged to the distal end portions of the first subpixel electrode 191a in the area A compared to the liquid crystal 31 in the area B or the area C, thereby being disadvantageous to side visibility.

FIG. 7 illustrates transmittance of portions of pixel according to applied voltages, that is, side visibility, in the area A, the area B, and the area C of the pixel electrode according to the exemplary embodiment.

Referring to FIG. 7, it can be seen that a curve of transmittance according to applied voltages in the area A and the area B is higher than the transmittance in the area C that is a main transmittance area in which the liquid crystals are inclined in the direction of the fine branch portions. Particularly, the curve of transmittance in the area A according to applied voltages is higher than the curve of a transmittance in the area B according to applied voltages, so that it can be recognized that the area A is a disadvantageous area in terms of side visibility.

Figure 8:
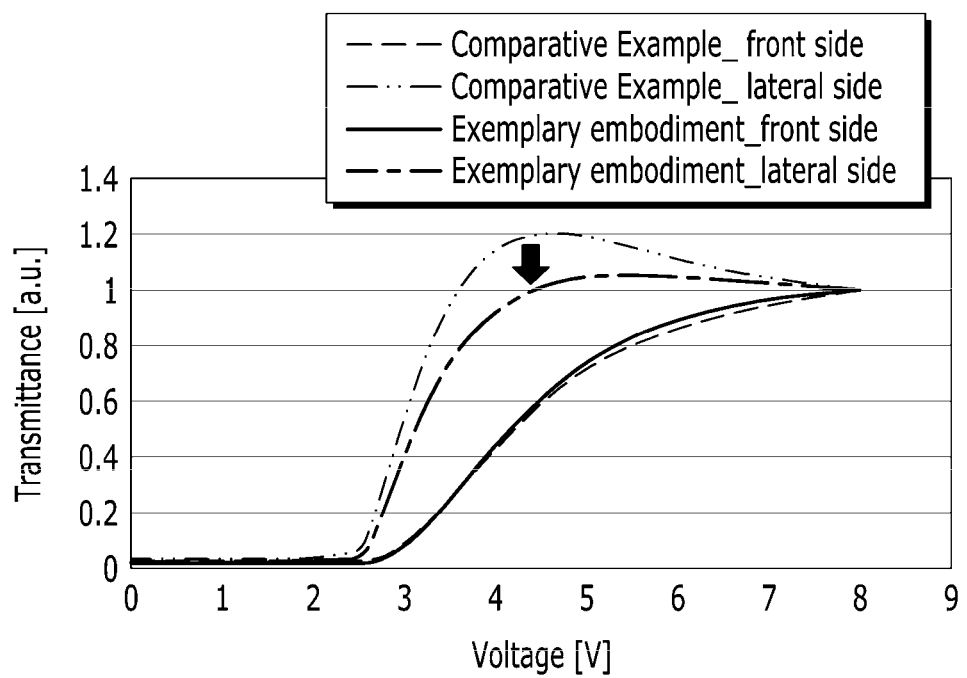
FIG. 8 is a simulation diagram illustrating transmittance according to applied voltages in area A of the pixel electrode according to the exemplary embodiment.

FIG. 8 is a simulation diagram illustrating transmittance according to applied voltages in the area A of the pixel electrode according to the exemplary embodiment.

Referring to FIG. 8, it can be seen, in area A, a difference in transmittance according to applied voltages between a front side and a lateral side of a pixel electrode according to a Comparative Example of the present inventive concept, and a difference in transmittance according to applied voltages between a front side and a lateral side of the pixel electrode according to the exemplary embodiment.

Here, a display device according to the Comparative Example of the present inventive concept does not include the voltage division reference voltage line overlapping the distal ends of the first fine branch portions 194a and the second fine branch portions 194b of the pixel electrode.

It can be seen, in area A, a difference in transmittance according to applied voltages between the front side and the lateral side of the pixel electrode according to the exemplary embodiment is decreased compared to the a difference in transmittance according to applied voltages between the front side and the lateral side of the pixel electrode according to the Comparative Example of the present inventive concept.

That is, the first horizontal portion 1722 of the voltage division reference voltage line 172 according to the exemplary embodiment of the present inventive concept overlaps the distal ends of the first fine branch portions 194a, and the second horizontal portion 1723 is formed so as to overlap the distal end of the second fine branch portions 194b to cover the area, in which the liquid crystals are vertically arranged, thereby improving side visibility.

Figure 9:
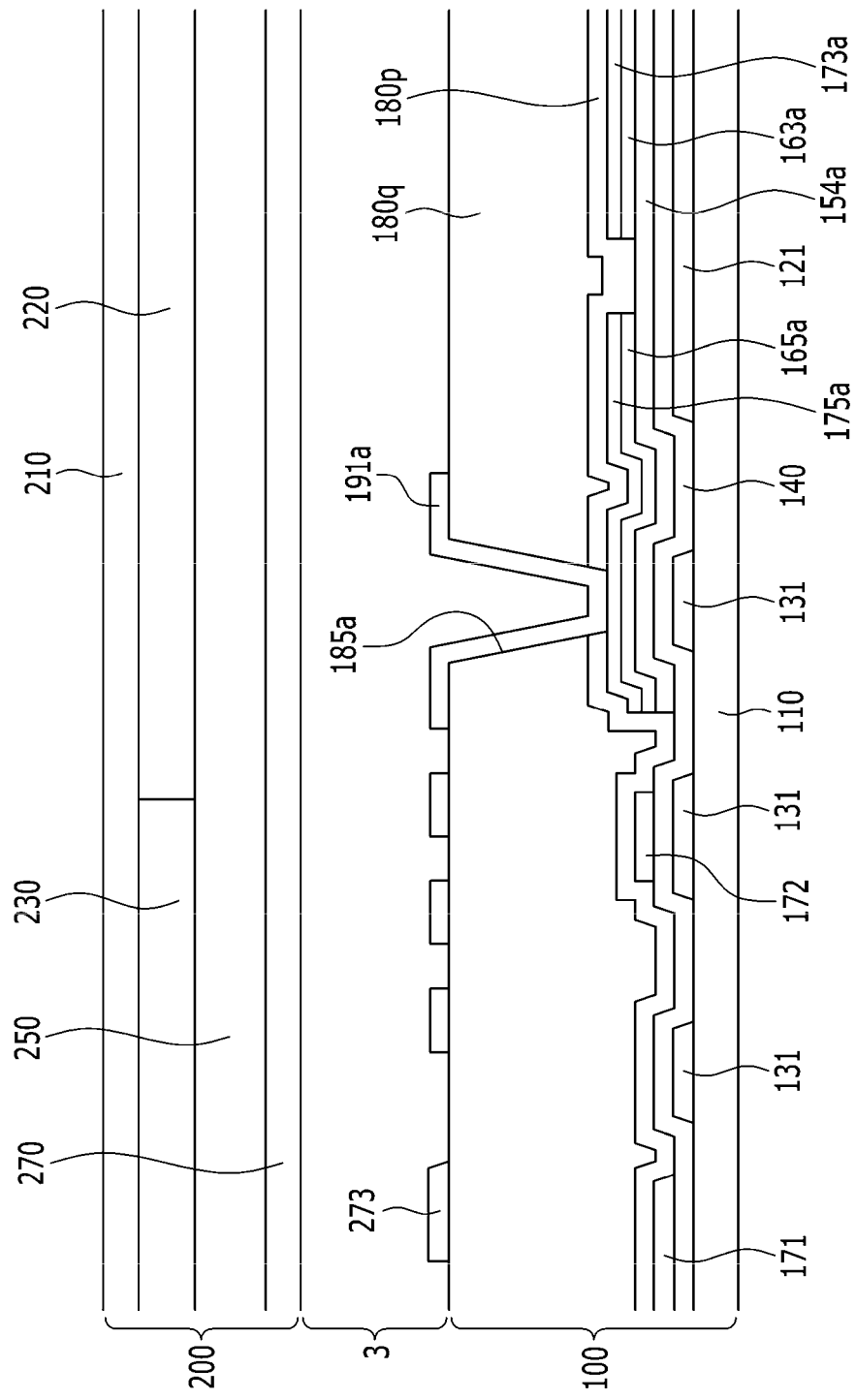
FIG. 9 is a cross-sectional diagram of the liquid crystal display according to the exemplary embodiment.

Then, the liquid crystal display including the thin film transistor array panel according to the exemplary embodiment will be described in detail with reference to FIG. 9. FIG. 9 is a cross-sectional diagram of the liquid crystal display according to the exemplary embodiment.

Referring to FIG. 9, constituents of a lower display substrate 100 of the liquid crystal display according to the exemplary embodiment are the same as the constituents of the thin film transistor array panel. A detailed description of the same constituent element will be omitted.

Now, an upper display substrate 200 will be described.

A light blocking member 220 is formed on an insulating substrate 210 made of transparent glass, plastic or the like. The light blocking member 220 is also called as a black matrix and prevents light leakage.

A plurality of color filters 230 is formed on a substrate 210. In the case where the second passivation layer 180q of the lower display substrate 100 is a color filter, the color filter 230 of the upper display substrate 200 may be omitted. Further, the light blocking member 220 of the upper display substrate 200 may also be formed in the lower display substrate 100.

An overcoat 250 is formed on the color filter 230 and the light blocking member 220. The overcoat 250 may be made of an (organic) insulating material, and prevents the color filter 230 from being exposed and provides a flat surface. The overcoat 250 may be omitted.

The liquid crystal layer 3 has negative dielectric anisotropy, and liquid crystal molecules of the liquid crystal layer 3 are aligned so that long axes thereof are vertical to the surfaces of the two display substrates 100 and 200 in a state in which there is no electric field.

The first subpixel electrode 191a and the second subpixel electrode 191b, to which the data voltage is applied, generate an electric field together with the common electrode 270 of the upper display substrate 200 to determine a direction of the liquid crystal molecule of the liquid crystal layer 3 between the two electrodes 191 and 270. Luminance of light passing through the liquid crystal layer 3 is changed according to the direction of the liquid crystal molecules determined as described above.

Figure 10:
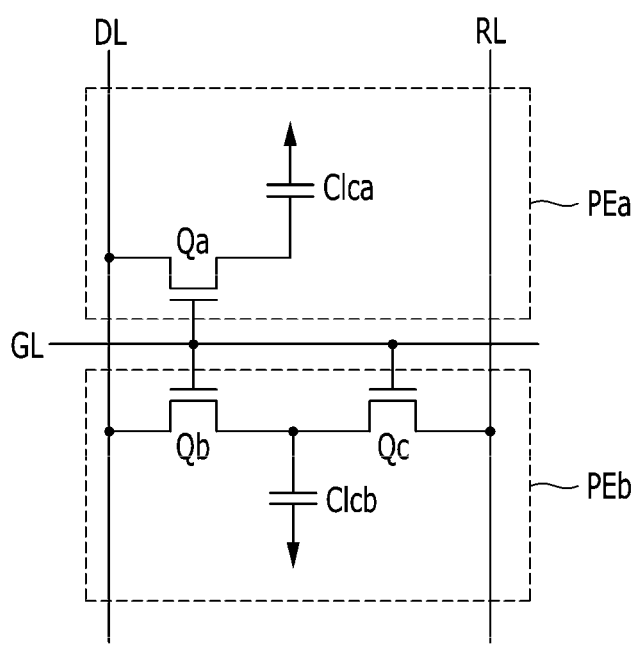
FIG. 10 is an equivalent circuit diagram of one pixel of the liquid crystal display according to the exemplary embodiment.

Then, signal lines and a disposition of the pixels of the liquid crystal display according to the exemplary embodiment, and a method of driving the liquid crystal display will be described with reference to FIG. 10. FIG. 10 is an equivalent circuit diagram of one pixel of the liquid crystal display according to the exemplary embodiment.

Referring to FIG. 10, one pixel PX of the liquid crystal display according to the present exemplary embodiment includes a plurality of signal lines including a gate line GL transmitting a gate signal, a data line DL transmitting a data signal, and a voltage division reference voltage line RL transmitting a voltage division reference voltage, first, second, and third switching elements Qa, Qb, and Qc connected to the plurality of signal lines, and first and second liquid crystal capacitors Clca and Clcb.

The first switching element Qa and the second switching element Qb are connected to the gate line GL and the data line DL, respectively, and the third switching element Qc is connected to an output terminal of the second switching element Qb and the voltage division reference voltage line RL.

The first switching element Qa and the second switching element Qb are three terminal elements of a thin film transistor and the like, and control terminals thereof are connected to the gate line GL, input terminals thereof are connected to the data line DL, an output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is also the three terminal element of a thin film transistor and the like, a control terminal thereof is connected to the gate line GL, an input terminal thereof is connected to the second liquid crystal capacitor Clcb, and an output terminal thereof is connected to the voltage division reference voltage line RL.

When a gate-on signal is applied to the gate line GL, the first switching element Qa, the second switching element Qb, and the third switching element Qc connected to the gate line GL are turned on. Accordingly, the data voltage applied to the data line DL is applied to a first subpixel electrode PEa and a second subpixel electrode PEb through the first switching element Qa and the second switching element Qb which are turned on. In this case, the data voltages applied to the first subpixel electrode PEa and the second subpixel electrode PEb are the same as each other, and the first liquid crystal capacitor Clca and the second liquid crystal capacitor Clcb are charged with the same value which is a difference between the common voltage and the data voltage. Simultaneously, the voltage charged in the second liquid crystal capacitor Clcb is divided through the turned-on third switching element Qc. Accordingly, a voltage value charged in the second liquid crystal capacitor Clcb is decreased by the difference between the common voltage and the voltage division reference voltage. That is, the voltage charged in the first liquid crystal capacitor Clca is higher than the voltage charged in the second liquid crystal capacitor Clcb.

As described above, the voltage charged in the first liquid crystal capacitor Clca is different from the voltage charged in the second liquid crystal capacitor Clcb. Since the voltage charged in the first liquid crystal capacitor Clca and the voltage charged in the second liquid crystal capacitor Clcb are different from each other, inclination angles of liquid crystal molecules in the first subpixel and the second subpixel become different from each other, accordingly, luminance of the two subpixels become different from each other. Accordingly, when the voltage charged in the first liquid crystal capacitor Clca and the voltage charged in the second liquid crystal capacitor Clcb are appropriately adjusted, an image viewed in a lateral side may become close to an image viewed in a front side as closely as possible, such that side visibility may be improved.

In the illustrated exemplary embodiment, in order to make the voltage charged in the first liquid crystal capacitor Clca and the voltage charged in the second liquid crystal capacitor Clcb be different from each other, the third switching element Qc connected to the second liquid crystal capacitor Clcb and the voltage division reference voltage line RL is included, but in a liquid crystal display according to another exemplary embodiment, a second liquid crystal capacitor Clcb may also be connected to a step-down capacitor. Particularly, the liquid crystal display includes the third switching element including a first terminal connected to the step-down gate line, a second terminal connected to the second liquid crystal capacitor Clcb, and a third terminal connected to the step-down capacitor, so that a part of the charge quantity charged in the second liquid crystal capacitor Clcb is charged in the step-down capacitor, thereby setting the charge voltage of the first liquid crystal capacitor Clca and the charge voltage of the second liquid crystal capacitor Clcb to be different from each other. Further, in a liquid crystal display according to another exemplary embodiment, a first liquid crystal capacitor Clca and a second liquid crystal capacitor Clcb are connected to different data lines to receive different data voltages, so that a charge voltage of the first liquid crystal capacitor Clca and a charge voltage of the second liquid crystal capacitor Clcb may be set to be different from each other. In addition, a charge voltage of the first liquid crystal capacitor Clca and a charge voltage of the second liquid crystal capacitor Clcb may be set to be different from each other by other various methods.

Then, a pixel electrode and a voltage division reference voltage line of a liquid crystal display according to another exemplary embodiment will be described with reference to FIGS. 11 to 13.

Figure 11:
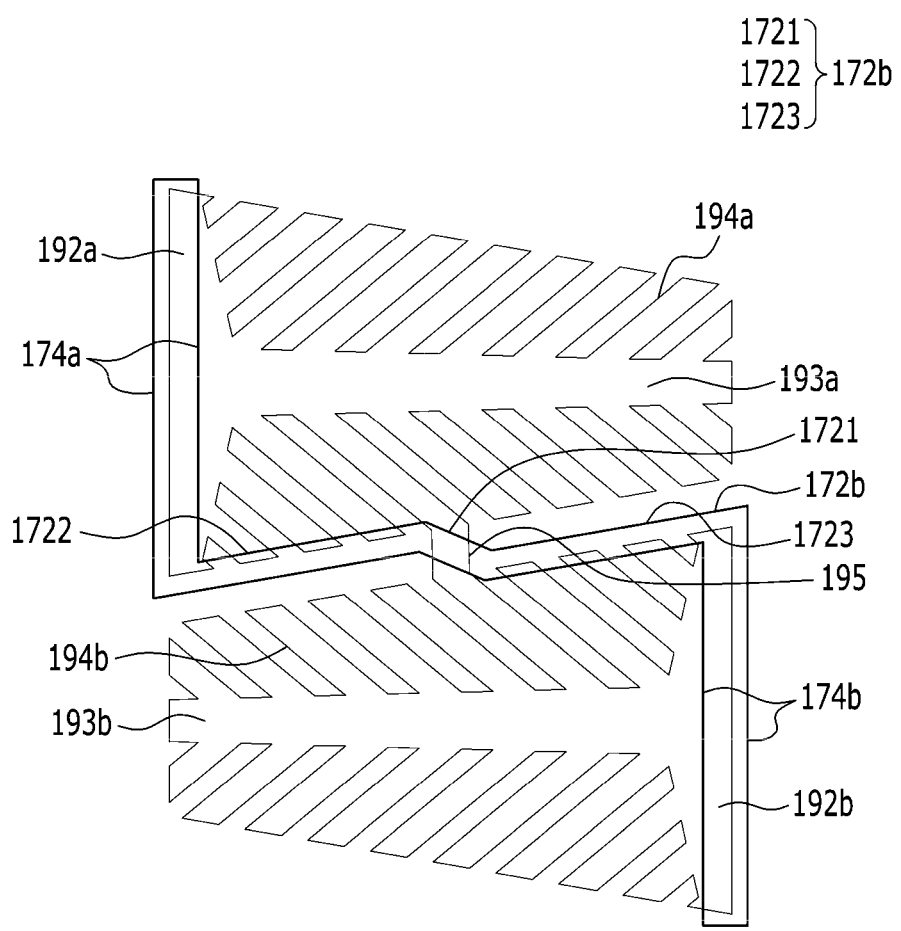
FIG. 11 is a layout view illustrating a pixel electrode and a voltage division reference voltage line of a liquid crystal display according to another exemplary embodiment.

First, FIG. 11 is a layout view illustrating a pixel electrode and a voltage division reference voltage line of a liquid crystal display according to another exemplary embodiment, and the liquid crystal display according to another exemplary embodiment has the pixel electrode and the voltage division reference voltage line which are the same as the pixel electrode and the voltage division reference voltage line illustrated in FIG. 5, except for a configuration of a plurality of fine branch portions and a configuration of a second horizontal portion of the voltage division reference voltage line. Accordingly, the same constituent element is denoted by the same reference numeral, and a repeated description of the same constituent element will be omitted.

Referring to FIG. 11, a pixel electrode of the liquid crystal display according to the exemplary embodiment includes first stem portions 192a and 193a and a plurality of first fine branch portions 194a obliquely extending from the first stem portions 192a and 193a, and second stem portions 192b and 193b and a plurality of second fine branch portions 194b obliquely extending from the second stem portions 192b and 193b. Further, the pixel electrode 191a includes a connection portion 195 connecting some of the plurality of first fine branch portions 194a and some of the plurality of second fine branch portions 194b.

The plurality of first fine branch portions 194a extending from the first horizontal stem portion 193a is obliquely extending in a direction, in which the distal ends of the plurality of first fine branch portions 194a becomes distant from the first vertical stem portion 192a, and the plurality of second fine branch portions 194b extending from the second horizontal stem portion 193b obliquely extends in a direction, in which the distal ends of the plurality of second fine branch portions 194b becomes distant from the second vertical stem portion 192b. That is, a heading direction of the plurality of first fine branch portions 194a is different from a heading direction of the plurality of second fine branch portions 194b.

In this case, a length of the plurality of first fine branch portions 194a increases according to an increase in distance from the first vertical stem portion 192a. That is, a distal end of the plurality of first fine branch portions 194a is inclined at a predetermined angle with respect to a horizontal direction.

Further, lengths of the plurality of second fine branch portions 194b extending from the second horizontal stem portion 193b are decreased according to an increase in distance from the second vertical stem portion 192b. That is, distal ends of the plurality of second fine branch portions 194b are inclined at a predetermined angle with respect to the horizontal direction.

A voltage division reference voltage line 172 includes a first vertical portion 174a and a second vertical portion 174b, and a center horizontal portion 172b connecting the first vertical portion 174a and the second vertical portion 174b.

The first vertical portion 174a overlaps the first vertical stem portion 192a, and the second vertical portion 174b overlaps the second vertical stem portion 192b.

A bent portion 1721 of the center horizontal portion 172b is bent at a point overlapping the connection portion 195, a first horizontal portion 1722 of the center horizontal portion 172b extends in a diagonal direction so as to overlap the distal ends of the first fine branch portions 194a, and a second horizontal portion 1723 of the center horizontal portion 172b extends in a diagonal direction so as to overlap the distal ends of the second fine branch portions 194b.

That is, the first horizontal portion 1722 extends in the diagonal direction while overlapping distal ends of the plurality of first fine branch portions 194a adjacent to the first vertical stem portion 192a, and the second horizontal portion 1723 extends in the diagonal direction while overlapping distal ends of the plurality of second fine branch portions 194b adjacent to the second vertical stem portion 192b.

Figure 12:
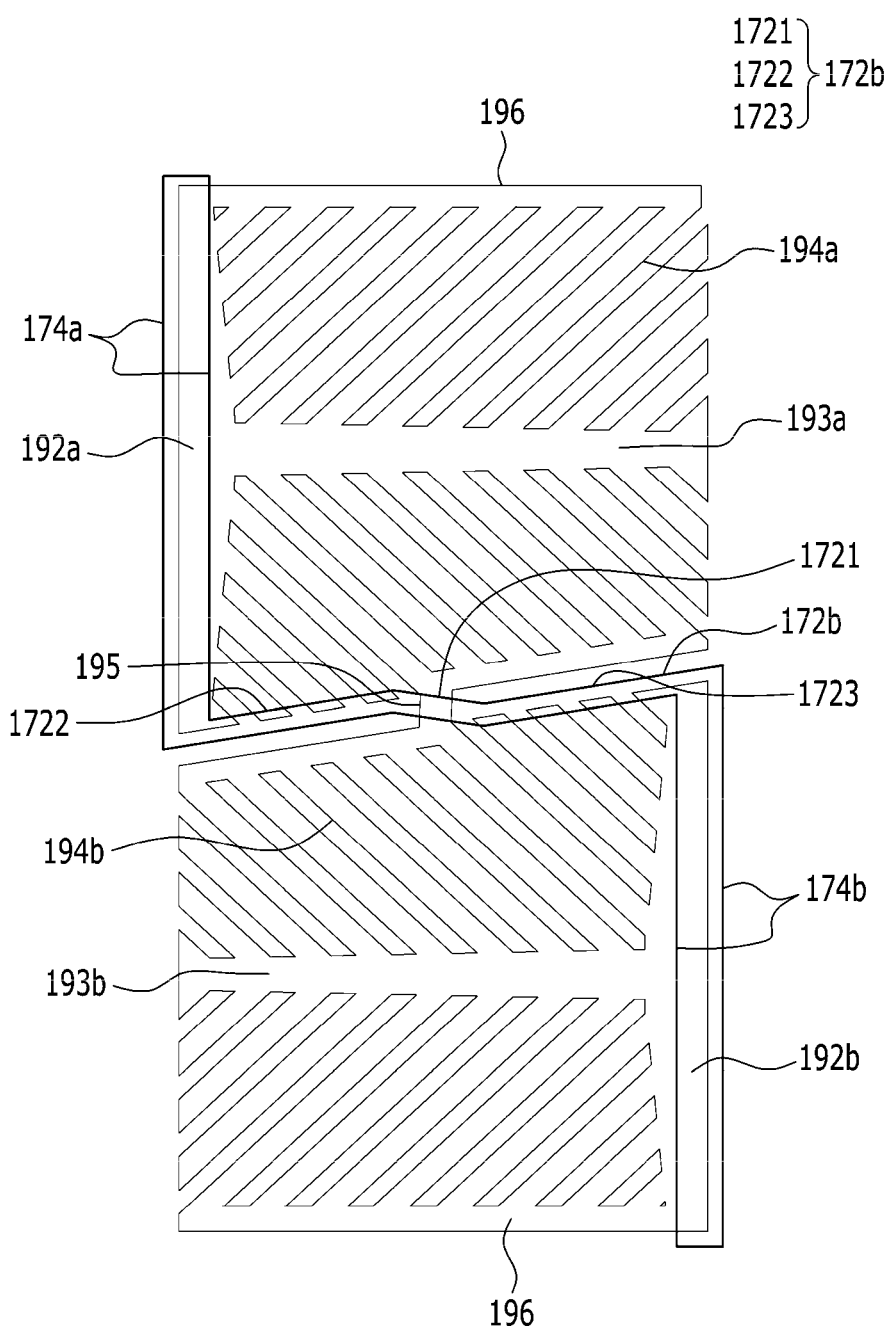
FIG. 12 is a layout view of a pixel electrode and a voltage division reference voltage line of a liquid crystal display according to another exemplary embodiment.

FIG. 12 is a layout view illustrating a pixel electrode and a voltage division reference voltage line of a liquid crystal display according to another exemplary embodiment, and the liquid crystal display according to another exemplary embodiment has the pixel electrode and the voltage division reference voltage line which are the same as the pixel electrode and the voltage division reference voltage lines illustrated in FIGS. 5 and 10, except for a configuration of a plurality of fine branch portions, a configuration of a second horizontal portion of the voltage division reference voltage line, and an edge portion of the pixel electrode. Accordingly, the same constituent element is denoted by the same reference numeral, and a repeated description of the same constituent element will be omitted.

Referring to FIG. 12, distal ends of a plurality of first fine branch portions 194a and distal ends of a plurality of second fine branch portions 194b, which face each other, are inclined at a predetermined angle with respect to a horizontal direction.

More particularly, lengths of the plurality of first fine branch portions 194a adjacent to the plurality of second fine branch portions 194b and extending from the first horizontal stem portion 193a decrease according to an increase in distance from the first vertical stem portion 192a, and lengths of the plurality of second fine branch portions 194b adjacent to the plurality of first fine branch portions 194a and extending from the second horizontal stem portion 193b decrease according to an increase in distance from the second vertical stem portion 192b.

Distal ends of the plurality of first fine branch portions 194a and the plurality of second fine branch portions 194b, which do not face each other, are in a horizontal direction.

Further, the pixel electrode further includes edge portions 196 which connect distal ends of the first fine branch portions 194a and the second fine branch portions 194b, and connected with the first vertical stem portion 192a and the second vertical stem portion 192b.

Figure 13:
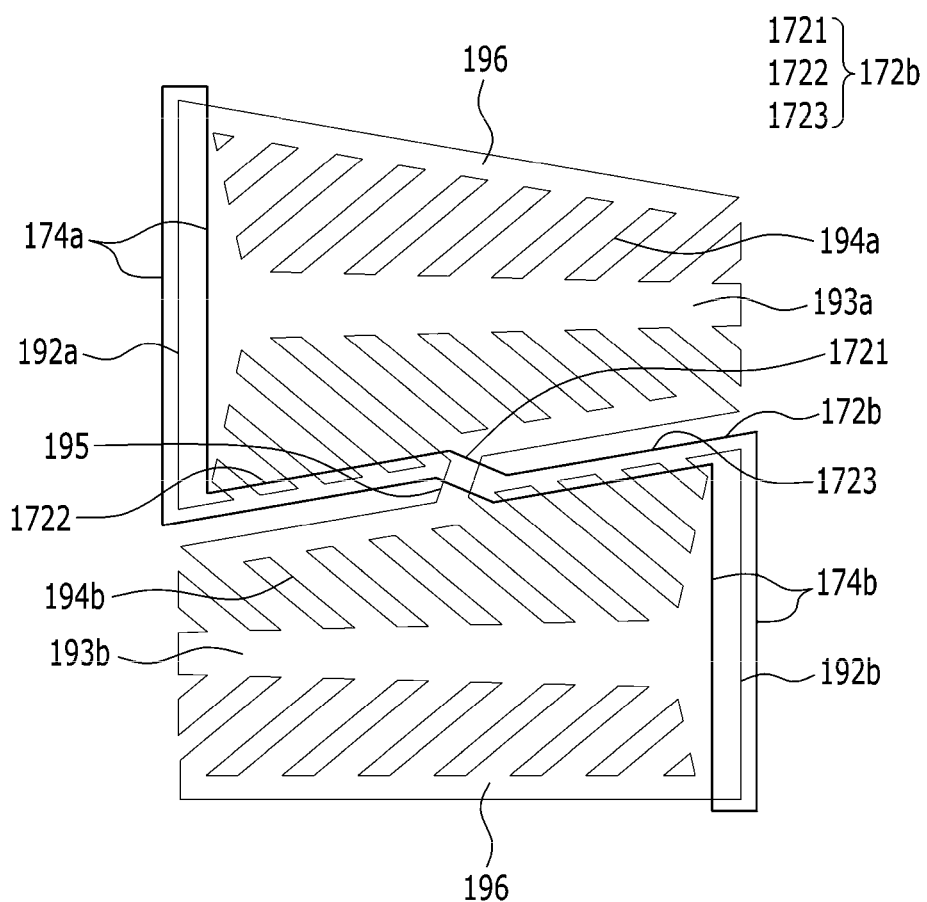
FIG. 13 is a layout view of a pixel electrode and a voltage division reference voltage line of a liquid crystal display according to another exemplary embodiment.

Next, FIG. 13 is a layout view illustrating a pixel electrode and a voltage division reference voltage line of a liquid crystal display according to another exemplary embodiment, and the liquid crystal display according to another exemplary embodiment has the pixel electrode which is the same as the pixel electrode illustrated in FIG. 12, except for a configuration of a plurality of fine branch portions. Accordingly, the same constituent element is denoted by the same reference numeral, and a repeated description of the same constituent element will be omitted.

Referring to FIG. 13, distal ends of a plurality of first fine branch portions 194a and distal ends of a plurality of second fine branch portions 194b, which face each other, are parallel to each other and extend in a diagonal direction.

Distal ends of a plurality of first fine branch portions 194a, which do not face a plurality of second fine branch portions 194b, extend in a diagonal direction, in which lengths of the first fine branch portions 194a extending from a first horizontal stem portion 193a decrease according to an increase in distance from a first vertical stem portion 192a, and distal ends of a plurality of second fine branch portions 194b, which do not face the plurality of first fine branch portions 194a, extend in a horizontal direction.

One form of the pixel electrode has been described with reference to FIGS. 11 to 13, but the pixel electrode is not limited thereto, and the pixel electrode according to the exemplary embodiment may be changed in various forms, and the edge portion 196 may be omitted. In this case, a second horizontal portion of a voltage division reference voltage line is formed so as to overlap the distal ends of the plurality of fine branch portions which faces each other.

As described above, in the pixel electrode according to the exemplary embodiment, the distal ends of the plurality of fine branch portions, which face each other, is formed in a diagonal direction, and the horizontal portion of the voltage division reference voltage line is formed so as to overlap the distal ends of the plurality of fine branch portions, so that the voltage division reference voltage line covers areas having liquid crystal molecules aligned vertically to the insulating substrate due to a lateral field, thereby improving side visibility.

While this disclosure has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a gate line and storage electrode lines formed on the first substrate;
a semiconductor layer formed on the gate line and the storage electrode lines;
a data line, a drain electrode, and a voltage division reference voltage line formed on the semiconductor layer;
a pixel electrode formed on the data line, the drain electrode, and the voltage division reference voltage line, and including a first stem portion, a plurality of first fine branch portions obliquely extending from the first stem portion, a second stem portion, a plurality of second fine branch portions obliquely extending from the second stem portion, and a connection portion connecting a portion of the first fine branch portions and a portion of the second fine branch portions;
a second substrate facing the first substrate;
a common electrode formed on the second substrate,
wherein the voltage division reference voltage line includes a bent portion bent at a portion overlapping the connection portion, and a horizontal portion connected with the bent portion and extending in a first direction while overlapping distal ends of the first fine branch portions and distal ends of the second fine branch portions; and
wherein the bent portion has a predetermined angle with respect to the first direction.

2. The liquid crystal display of claim 1, wherein the first stem portion includes a first vertical stem portion and a first horizontal stem portion connected with the first vertical stem portion and extending in a direction parallel to the gate line, and
wherein the second stem portion includes a second vertical stem portion and a second horizontal stem portion connected with the second vertical stem portion and extending in a direction parallel to the gate line.

3. The liquid crystal display of claim 2, wherein the horizontal portion includes a first horizontal portion overlapping the distal ends of the first fine branch portions extending from the first vertical stem portion, and a second horizontal portion overlapping the distal ends of the second fine branch portions extending from the second vertical stem portion.

4. The liquid crystal display of claim 3, wherein the first horizontal portion and the second horizontal portion are disposed at opposite sides of the connection portion.

5. The liquid crystal display of claim 3, wherein the voltage division reference voltage line includes a plurality of vertical portions connected with the horizontal portion, and
wherein the plurality of vertical portions overlaps the first vertical stem portion and the second vertical stem portion.

6. The liquid crystal display of claim 2, wherein an angle between an extending direction of the first fine branch portions and an extending direction of the second fine branch portions which are adjacent to the first fine branch portions is 180°.

7. The liquid crystal display of claim 2, wherein lengths of the first fine branch portions decrease according to an increase in distance from the first vertical stem portion, and lengths of the second fine branch portions decrease according to an increase in distance from the second vertical stem portion.

8. The liquid crystal display of claim 7, wherein
the voltage division reference voltage line includes a plurality of vertical portions connected with the horizontal portion, and
the plurality of vertical portions overlaps the first vertical stem portion and the second vertical stem portion.

9. The liquid crystal display of claim 8, wherein the pixel electrode further includes a first edge portion connecting distal ends of the first fine branch portions, and connected with the first vertical stem portion and the first horizontal stem portion.

10. The liquid crystal display of claim 9, wherein
the pixel electrode further includes a second edge portion connecting distal ends of the second fine branch portions, and connected with the second vertical stem portion and the second horizontal stem portion.

11. The liquid crystal display of claim 1, wherein the pixel electrode includes a first subpixel electrode and a second subpixel electrode, which are disposed on opposite sides with respect to the gate line, and
wherein each of the first subpixel electrode and the second subpixel electrode includes the first stem portion, the plurality of first fine branch portions, the second stem portion, the plurality of second fine branch portions, and the connection portion.

12. The liquid crystal display of claim 11, wherein the first stem portion of the first subpixel electrode includes a first vertical stem portion and a first horizontal stem portion connected with the first vertical stem portion and extending in a direction parallel to the gate line, and
wherein the second stem portion of the first subpixel electrode includes a second vertical stem portion and a second horizontal stem portion connected with the second vertical stem portion and extending in a direction parallel to the gate line.

13. The liquid crystal display of claim 12, wherein the first stem portion of the second subpixel electrode includes a first vertical stem portion and a first horizontal stem portion connected with the first vertical stem portion and extending in a direction parallel to the gate line, and
wherein the second stem portion of the second subpixel electrode include a second horizontal stem portion connected with the second horizontal stem portion and extending in a direction parallel to the gate line.

14. The liquid crystal display of claim 13, wherein the voltage division reference voltage line divides a first subpixel area, in which the first subpixel electrode exists, into two areas, and surrounds three sides of an individual area, and
wherein the voltage division reference voltage line divides a second subpixel area, in which the second subpixel electrode exists, into two areas, and surrounds three sides of an individual area.

15. The liquid crystal display of claim 14, wherein sides, in which the voltage division reference voltage line is not formed, in the first subpixel area are sides disposed at opposite sides in the two areas, and
wherein sides, in which the voltage division reference voltage line is not formed, in the second subpixel area are sides disposed at opposite sides in the two areas.

16. The liquid crystal display of claim 14, wherein the horizontal portion includes a plurality of horizontal portions, and
wherein the voltage division reference voltage line includes a plurality of vertical portions connected with the plurality of the horizontal portions, and
wherein the plurality of vertical portions overlaps the first vertical stem portion and the second vertical stem portion.

17. The liquid crystal display of claim 11, wherein the storage electrode line formed in the first subpixel electrode area has a quadrangular ring shape surrounding four surfaces of an area, in which the first subpixel electrode is formed.

18. The liquid crystal display of claim 17, wherein the storage electrode line formed in the second subpixel electrode area has the same shape as that of the voltage division reference voltage line formed in the second subpixel electrode area, and is electrically insulated from the voltage division reference voltage line while overlapping the voltage division reference voltage line.

19. The liquid crystal display of claim 11, further comprising:
a shielding electrode disposed on the same layer as that of the pixel electrode,
wherein the shielding electrode vertically extends along one pixel area defined by the first subpixel electrode and the second subpixel electrode, and includes a vertical portion overlapping the data line and a horizontal portion crossing a space between the first subpixel electrode and the second subpixel electrode.

* * * * *